United States Patent [19]
Sakai

[11] Patent Number: 5,986,751
[45] Date of Patent: Nov. 16, 1999

[54] ATOMIC ABSORPTION PHOTOMETER

[75] Inventor: Masumi Sakai, Kyoto, Japan

[73] Assignee: Shimadzu Corporation, Kyoto, Japan

[21] Appl. No.: 09/080,817

[22] Filed: May 18, 1998

[30] Foreign Application Priority Data

Jun. 30, 1997  [JP]  Japan ................................... 9-190623

[51] Int. Cl.[6] .................................................. G01J 1/40
[52] U.S. Cl. .......................... 356/234; 356/235; 356/213; 356/300; 356/303
[58] Field of Search .................................. 356/234, 213, 356/235, 300, 303

[56] References Cited

U.S. PATENT DOCUMENTS

| | | | |
|---|---|---|---|
| 4,729,655 | 3/1988 | Boggy et al. | 356/121 |
| 5,007,717 | 4/1991 | Cutolo et al. | 350/353 |
| 5,611,998 | 3/1997 | Aussenegg et al. | 422/82.05 |

Primary Examiner—Frank G. Font
Assistant Examiner—Reginald Ratliff
Attorney, Agent, or Firm—Majestic, Parson, Siebert & Hsue P.C.

[57] ABSTRACT

An atomic absorption photometer with a hollow cathode lamp and a deuterium lamp uses for each a power source which receives a variable current and switches it on and off so as to output a constant voltage.

18 Claims, 3 Drawing Sheets

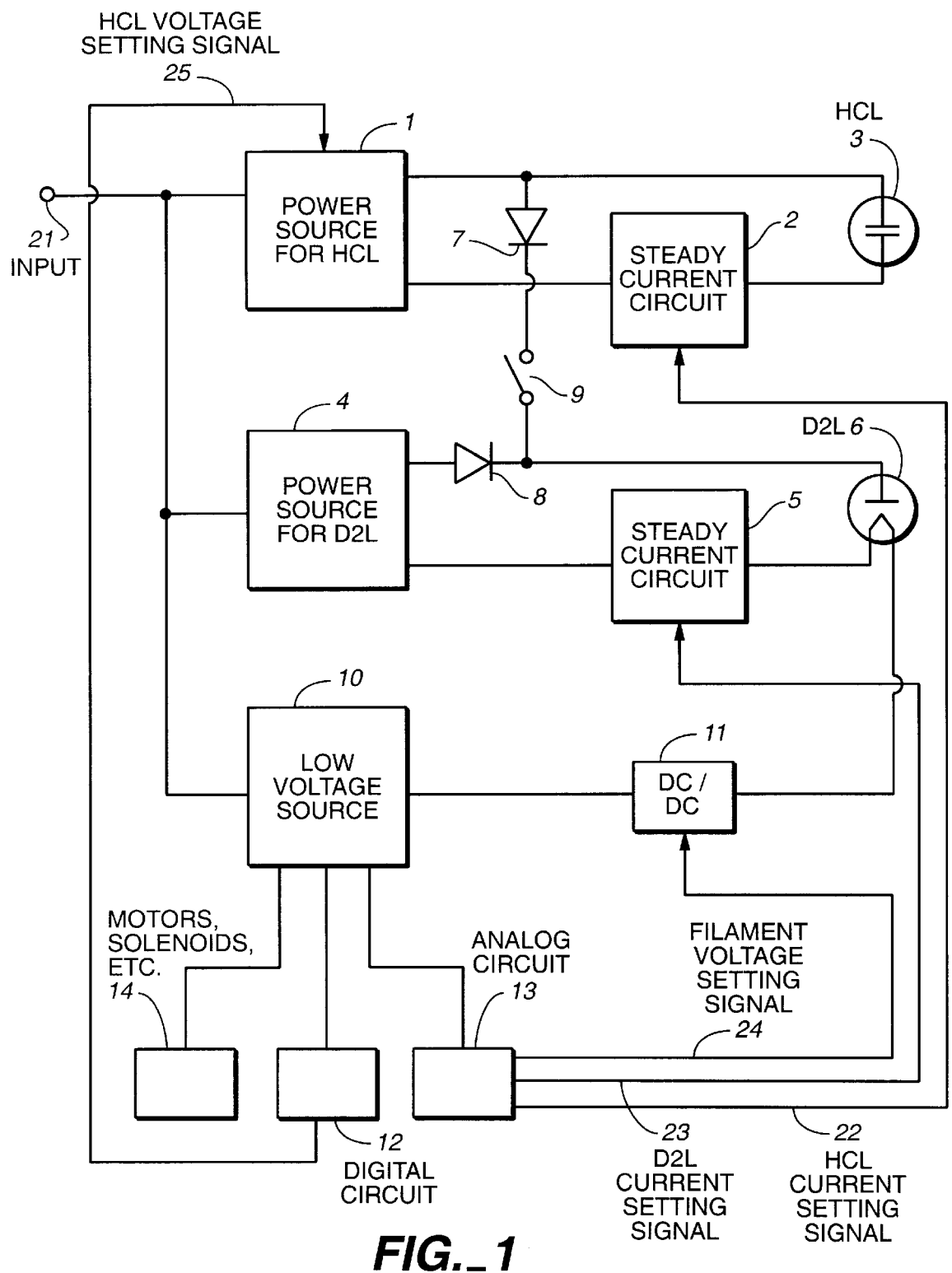
FIG._1

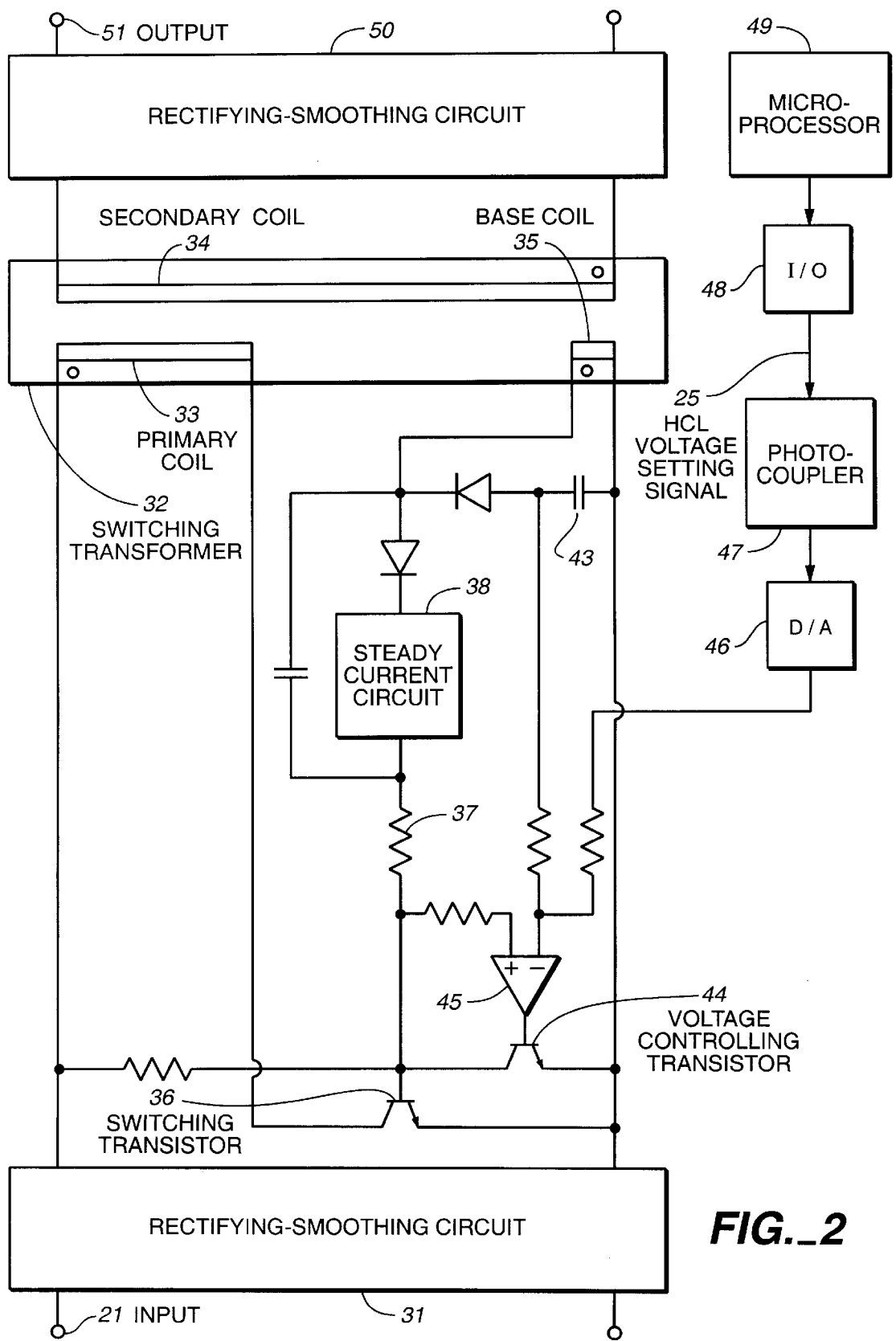
FIG._2

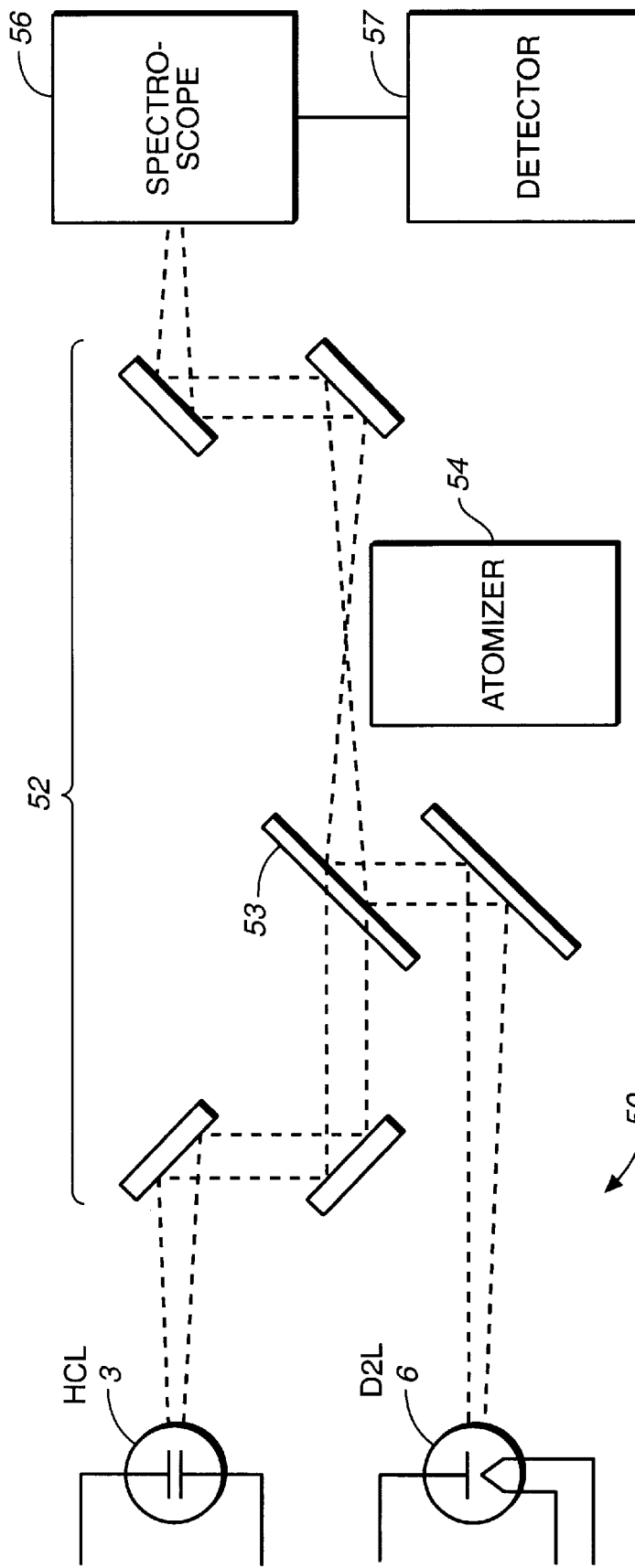
FIG._3

ATOMIC ABSORPTION PHOTOMETER

BACKGROUND OF THE INVENTION

This invention relates to an atomic absorption photometer and in particular to an atomic absorption photometer containing power source circuits for its light sources.

Atomic absorption photometers use a hollow cathode lamp (HCL) as a source of light for observing atomic absorption. The HCL is a discharge tube, adapted to start discharging if a DC voltage above its starting voltage is applied thereto and to generate light by exciting the gas which is sealed inside. Once the discharge is started, it can be continued and the light-emitting condition can be maintained by a voltage which is lower than the starting voltage while it should still be above its discharge maintaining voltage. The starting voltage is 170–350 V and the discharge maintaining voltage is 120–240 V but these values vary, depending on the kind of the sealed element, individual characteristics of the lamp and the age of the lamp. Although the discharge maintaining voltage is lower than the starting voltage, the difference therebetween is small, and the starting voltage is usually applied continuously to maintain the discharge thereafter. The discharge current is about 4–40 mA.

As the power source of an HCL, a commercial power source is usually used after its voltage is changed by means of a transformer for commercial frequencies and the current is subjected to rectifying and smoothing processes.

In order to obtain stable data in atomic absorption measurements, it is important to stabilize the brightness of the HCL. For this purpose, it is necessary to control the discharge current, and it has been common to make use of a steady current circuit which is a combination of an operational amplifier and a transistor or a field effect transistor (both being herein referred to as "the current-steadying transistor").

In many situations in atomic absorption photometry, a heavy hydrogen (deuterium) lamp (D2L) is also used as the light source for a background correction, that is, for making corrections on undesired absorption. In order to start the discharge of a D2L, a DC current is passed first through its filament to heat it and a DC voltage greater than its starting voltage is applied after a specified length of time. Immediately thereafter, the applied voltage is lowered to a level which is still above its discharge maintaining voltage to maintain the discharge so as to maintain the lamp in the light-emitting condition. For a D2L, the starting voltage is 350–400 V and the discharge maintaining voltage is 75–95 V but these values also vary, depending on individual characteristics and the age of the lamp. The discharge current is usually about 300 mA. Once the discharge is started, the voltage for heating the filament is also lowered in order to reduce the heat production from the lamp and hence to improve its useful lifetime. The voltage and the current through the filament are, for example, 2.5 V and 4A at the time of starting the discharge and 1.0 V and 1.8A after the lamp is lit. As the power source of an D2L, it has also been customary to use a commercial power source after varying its voltage by means of a transformer for commercial frequencies and subjecting the current to rectifying and smoothing processes. In order to obtain stable data in atomic absorption photometry, it is also important to stabilize the brightness of the D2L. For this purpose, it is necessary to control its discharge current and it has been common also to make use of a steady current circuit which is a combination of an operational amplifier and a current-steadying transistor.

The prior art technology described above has several problems. With a transformer for commercial frequencies; for example, the input voltage and the output voltage change in a mutually proportional relationship and hence its output voltage becomes lower if the voltage of the commercial power source serving as its power source becomes lower. For this reason, the prior art power source for the lamp has been designed by taking into consideration in particular the possibility of the input voltage dropping to a lower level. In other words, the output voltage of transformers for commercial frequency has been set such that a sufficiently steady current operation would be possible even when the input voltage has dropped to the lowest level within a specified range and the discharge maintaining voltage of the lamp was at its highest level.

In a power source circuit, the voltage (Vsi) applied to its steady-current circuit is determined by the following formula:

$$Vsi = Vmo - Vlm \quad (1)$$

where Vmo represents the output voltage of a discharge maintaining power source and Vlm represents the discharge maintaining voltage of the lamp. Since the power source is designed for the case of a lowest input voltage, as explained above, a somewhat higher voltage is applied to the steady-current circuit when a standard input voltage is applied to the power source circuit. If the voltage applied to the power source circuit is at its highest level, the voltage applied to the steady-current circuit becomes undesirably high. This is particularly so if the discharge maintaining voltage of the lamp is low.

In the steady-current circuit, the voltage (Vti) applied to its current-steadying transistor is nearly equal to the voltage applied to the steady-current circuit, that is:

$$Vti \approx Vsi \quad (2)$$

In other words, the voltage applied to the steady-current circuit is nearly entirely applied to the current-steadying transistor. Thus, the power (Wt) consumed by the current-steadying transistor is give as follows:

$$Wt \approx (Vmo - Vlm) \times (\text{Discharge current of the lamp}) \quad (3)$$

Because the power Wt given by (3) eventually becomes heat, the current-steadying transistor keeps generating heat at a significant rate even if the input voltage is at a standard level. Since the generation of heat not only implies a waste of useful energy but also affects the reliability of the current-steadying transistor adversely, it is necessary to make use of a large transistor and a heat radiator, but this brings in an additional problem that the steady-current characteristics become unstable during the transitory period before a thermal equilibrium is reached. This is a particularly serious problem when the input voltage approaches the upper limit of the specified range.

The HCL, in particular, is usually designed in accordance with the largest values of the discharge starting and discharge maintaining voltages for all of the target elements to be used for the atomic absorption photometer. Thus, the heat production from the current-steadying transistor according to Formula (3) becomes particularly large while the HCL for an element with a low discharge maintaining voltage is lit, making the aforementioned problems even more serious.

Since the discharge starting voltage of the D2L is a little higher than that of the HCL, it may be tempting to use a common power source for both of them. As explained above, however, variations are large in the output voltage of a discharge starting source for an HCL using a transformer for commercial frequencies. When the output voltage of the discharge starting source for the HCL is low and the starting voltage of the D2L is high, in particular, there is a possibility that the D2L may fail to start the discharge. For this reason, it has been customary to provide separate power sources for these two lamps.

A constant voltage source is used for the filament of a D2L and since it may be directly connected to the filament, there is no problem of heat generation by the current-steadying transistor. If the input voltage is outside a specified range, however, emission of light from the D2L may become unstable or the light may even be extinguished. If the voltage applied to the filament is to be reduced after the discharge is started, furthermore, there are two voltage levels that are required. This means that two kinds of secondary coil for the transformer must be provided and that a switch capable of passing a large current for the filament is required.

If the product is to be internationally marketed, furthermore, it must be usable with different commercial power voltages such as AC100 V, AC 120 V, AC220 V and AC240 V. If a single power source for light source is to be directly used under all these different circumstances, a very large current-steadying transistor and a heat radiator will have to be selected for the aforementioned reason of large heat production. According to a prior art technology, terminals with suitable coils were provided on the primary side of the transformer for commercial frequencies and a commercial power source was connected to one of the terminals so as to switch among different voltages. This, however, gives rise to additional problems such as the cost of a switching device and the time it takes to carry out the switching.

The effective sectional area of the core of a transformer is inversely proportional to its operating frequency. Since transformers for commercial frequencies operate at a relatively low frequency such as 50 and 60 cycles per second, the effective sectional area of their core must be relatively large. This means that such a transformer is bulky and heavy and prevents the atomic absorption photometers incorporating it from being made compact. Transformers for commercial frequencies require many metallic materials such as silicon steel plates and copper wires. If a transformer for commercial frequencies is used, furthermore, a relatively large current-steadying transistor and radiator are required, as explained above. This has been one of the reasons for the increased cost of an atomic absorption photometer.

Because the general specification for current and voltage applies to power sources for the digital and analog circuits within an atomic absorption photometer, it is relatively easy to form a switchable power source and there are many such sources that are commercially available. For power source for a light source, however, there has not been any which was commonly available and it has not been possible to dispense with transistors for commercial frequencies.

SUMMARY OF THE INVENTION

It is therefore an object of this invention to provide an atomic absorption photometer incorporating compact and inexpensive power sources capable of maintaining stability in the brightness of the light sources and corresponding to input voltages of a wide range, besides being efficient and safe.

An atomic absorption photometer embodying this invention, with which the above and other objects can be accomplished, may be characterized as having so-called "switching power source circuits" for its light sources.

What is herein referred to as a "switching power source circuit" is a circuit adapted to output a constant voltage by switching on and off a variable current which is inputted. It is therefore basically a source of a constant voltage and hence its output voltage is far more stable than that from a transformer for commercial frequencies of which the output voltage varies in proportion with its input voltage. In a situation where both an HCL and a D2L are used, for example, the output voltage should be set such that corresponding steady current circuits can function sufficiently well even when the output voltage is at a minimum for both the discharge starting power source for the HCL and the discharge maintaining power source for the D2L (that is, when the input voltage is at a minimum and the output current is at a maximum). In this manner, the standard value of the output voltage can be made smaller than by the prior art technology and generation of heat from the current-steadying transistor can be reduced. The current-steadying transistor generates heat mostly when the output voltage is at a maximum but since the variation in the output voltage is small, the amount of heat generated is reduced, compared to the prior art technology. Thus, the reliability of current-steadying transistor is improved, both the current-steadying transistor and the radiator can be made compact and the steady-current characteristic can be stabilized quickly.

Examples of switching mechanism for a switching power source circuit include the RCC (ringing choke converter) type and the forward type. Either type can serve the purpose of this invention but the RCC type is preferred. Reasons for this preference include that the circuit structure is simpler and hence the cost is lower and reliability is higher, that no switching controller is necessary because it is of a self-excitation type, and that the output power which can be handled is the same as the consumed power by the HCL and the D2L.

In order to stabilize the output voltage from such a switching power source circuit, the output voltage is detected and fed back to its control circuit. Examples of the method for such a feedback include the method by using a photo-coupler and the method of using a magnetic circuit. In the case of atomic absorption photometers, to which the present invention relates; however, there is no urgent need to stringently stabilize the output voltage from the source because the brightness of the lamps is adapted to be stabilized by a steady-current control. Thus, as far as concern the charge starting voltage source for the HCL and the charge maintaining voltage source for the D2L, a less expensive magnetic circuit is sufficient as feedback means for feeding back the output voltage to the control circuit for the switching.

In general, the resistance R of a resistor connected to a transistor serving as a switch in such a circuit is set according to:

R=(Minimum voltage of the base coil)/((Maximum collector current of the transistor)/(Minimum rate of direct current amplification of the transistor))     (4)

In the case of the discharge starting power source for the HCL, however, the inductance is high because the output voltage is high and the number of secondary windings is also large. As a result, the switching circuit sometimes fails to oscillate normally. In order to prevent the occurrence of such a situation, the resistance value may be set 3–4 times larger than the value obtained by Formula (4) given above. If the base resistance is thus increased; however, the base current tends to be insufficient and the output voltage too low. Thus, it is necessary to cause a control circuit to output a corrected control signal by taking into account this lowering of the output voltage such that the output voltage will be at a specified level.

If the switching frequency of the discharge starting power source for the HCL and that of the discharge maintaining power source for the D2L are related such that one is nearly an integral multiple of the other, there will be a beat which overlaps as a low-frequency noise with the currents to the HCL and the D2L. Thus, these frequencies are set so as to avoid the occurrence of such a beat by adjusting the winding numbers of the coils and inductance of the transformer for the switching power source.

Since the charge starting and maintaining voltages are known, depending on the selected element sealed inside the HCL, the output voltage is controlled so as to be sufficient for allowing the lamps to discharge and the steady current circuits to operate normally. The output voltage of a switching voltage source circuit can be easily adjusted from outside and hence the heat generation of the current-steadying transistor can be reduced. The power loss can be further reduced if the output voltage of the charge starting power source is lowered to the level of the discharge maintaining voltage after the discharge is started.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings:

FIG. 1 is a block diagram of a power source for an atomic absorption photometer embodying this invention; and FIG. 2 is a circuit diagram of the discharge power source for the HCL shown in FIG. 1; and FIG. 3 is a shematic block diagram of an atomic absorption photometer incorporating the power source of FIG. 1.

DETAILED DESCRIPTION OF THE INVENTION

The invention is described next by way of an example with reference to FIGS. 1 and 2. Power from a commercial source is received through a commercial power inputting terminal 21 in parallel by a discharge power source (for HCL) 1, a discharge maintaining power source (for D2L) 4 and a low voltage power source 10. The discharge power source 1 is connected to a HCL 3, and a steady current circuit (for HCL) 2 is connected in series therewith. The output voltage of the discharge power source 1 is set at a value (such as 460 V) such that the steady current circuit 2 can function even if this output voltage fluctuates to at its lowest level. The current value of the steady current circuit 2 can be set by a signal 22 (referred to as "the HCL current setting signal") which is transmitted to the steady current circuit 2 through a D/A converter (not shown) in an analog circuit 13 in response to a command from a microprocessor (shown at 49 in FIG. 2) in a digital circuit 12. The discharge maintaining power source 4 is connected to a D2L 6, and a steady current circuit (for D2L) 5 is connected in series therewith. The output voltage of the discharge maintaining power source 4 is set at a value (such as 140 V) such that the steady current circuit 5 can function even if this output voltage is at its lowest level. The current value of the steady current circuit 5 can be set by a signal 23 (referred to as "the D2L current setting signal") which is transmitted to the steady current circuit 5 through the D/A converter in the analog circuit 13 in response to a command from the microprocessor (shown at 49 in FIG. 2) in the digital circuit 12.

As shown in FIG. 2, the discharge power source 1 for the HCL 3 according to this embodiment of the invention is basically a switching circuit of the RCC type and hence its circuit structure is simple and there is no need for a switching controller. The same can be said also about the discharge maintaining power source 4 for the D2L 6.

As shown in FIG. 2, a voltage which is proportional to the voltage generated at the secondary coil 34 of a switching transformer 32 (of which the primary coil is indicated by numeral 33) by the magnetic circuit through its core is generated across a base coil 35. This voltage is kept on a capacitor 43 and is compared by a comparator 45 with the voltage outputted from the D/A converter 46 in response to a HCL voltage setting signal 25 such that the output voltage can be stabilized.

A resistor 37 is connected to the base of a switching transistor 36. The resistance value of this resistor is 3–4 times greater than that of a prior art resistor used for a similar purpose and given by Formula (4), or 100 $\Omega$ in this example, such that normal oscillations are obtained even in the case of a discharge power source with a high output voltage. As a result, the output voltage becomes somewhat lower but it is compensated for if the output voltage of the D/A converter 46 is set somewhat higher such that a desired level of output voltage can be obtained.

The switching frequencies of the discharge power source 1 and the discharge maintaining power source 4 are preliminarily adjusted such that neither is even close to being a multiple by a natural number of the other in order to prevent occurrence of a beat and hence of a low-frequency noise. This can be accomplished by adjusting the numbers of windings in the coils and the inductance of the switching transformer 32. For example, the switching frequencies of the discharge power source 1 and the discharge maintaining power source 4 may be set respectively at 20 kHz and 27 kHz while the lamps are emitting light.

The choice of element for the HCL 3 is inputted to a microprocessor 49 by the operator. With this information received, the microprocessor 49 serves to have a voltage which is suitable for the selected element to be outputted through a discharge power output terminal 51 by transmitting this voltage as a reference voltage to the comparator 45 through an input/output circuit 48, a photocoupler 47 for insulation and the D/A converter 46. The base voltage of the switching transistor 36 is inputted to the comparison input terminal of the comparator 45 such that, if the base voltage is higher than this reference voltage, a voltage controlling transistor 44 is switched on. The base current of the switching transistor 36 is bypassed and the switching transistor 36 is switched off. In this manner, the ON-time of the switching transistor 36 can be controlled, and eventually the output voltage from the discharge power output terminal 51 can be controlled. In FIG. 2, numerals 31 and 50 indicate a rectifying and smoothing circuit respectively on the side of the primary and secondary winding.

The discharge power source 1 is also used as the discharge starting power source for the D2L 6. Since the output voltage from the discharge power source 1 is 460 V and stable, this means that it is sufficiently above the discharge starting voltage of the D2L 6 and hence that the discharge will start dependably. After a specified voltage is applied from a DC/DC converter 11 to the filament of the D2L 6 and the steady current circuit S is activated by a filament voltage setting signal 24 such that a specified current will flow through the filament of the D2L 6, a discharge-starting switch 9 is closed so as to start the discharge of the D2L 6.

A few seconds thereafter, the switch 9 is opened again. The closing and opening of the switch 9 may be effected either manually or through the microcomputer 49. The DC/DC converter 11 is connected to the low voltage power source 10 and is adapted to output a voltage of 2.4 V or 1.0 V and is connected to the filament of the D2L 6.

The output voltage of this DC/DC converter 11 is determined by the filament voltage setting signal 24 outputted from the analog circuit 13 such that the voltage applied to the filament is lowered after the lamp is lit.

In order to be able to receive commercial power from sources in the range of AC100 V to AC240 V, a steady current circuit 38 is connected to the base of the switching transistor 36 such that the base current is made steady. If the range is only from AC100 V to AC 120 or from AC220 V to AC240 V, however, the circuit as shown in FIGS. 1 and 2 can function sufficiently properly without the presence of this steady current circuit 38.

The low voltage power source 10 serves as the power source for the aforementioned DC-DC converter 11, the digital circuit 12, the analog circuit 13 and other components such as motors and solenoids (indicated summarily by numeral 14 in FIG. 1). The low voltages to be supplied thereby may be, for example, 5 V, 15 V, 24 V and−15 V, it may be realized by means of a control IC or by connecting commercially available components. In summary, all power sources of the photometer can be of a switching type, and transformers for commercial frequencies can be dispensed with.

FIG. 3 shows schematically an atomic absorption photometer 50 embodying this invention, characterized as using switching power source circuits as described above. The atomic absorption photometer 50 comprises, as described in Japanese Patent Publication Tokkai 7-23268, for example, not only a HCL 3 and a D2L 6 with a power source as explained above with reference to FIGS. 1 and 2 but also an optical system 52 including a beam combiner 53 serving to combine beams of light outputted from the HCL 3 and the D2L 6, an atomizer 54 for atomizing a light-absorbing sample of interest, a spectroscope 56 and a detector 57 for analyzing the light spectroscopically absorbed by the atoms of the sample. The optical system 52, the spectroscope 56 and the detector 57 may all be of a known kind.

The invention has been described above with reference to only one embodiment but many modifications and variations are possible within the scope of the invention. The principal advantage obtained by this invention is that the output voltage becomes stable because use is made of switching power sources. The power source for the HCL can be directly used as the discharge starting power source for the D2L. For starting a discharge of the D2L, charging is required only temporarily and it is not a steady current. Thus, there does not arise any problem of overcharging by using the power source for the HCL in common.

Since a switching power source is used also for the filament of the D2L, a steady voltage is applied to the filament independently of variations in the input voltage such that the lighting condition of the D2L can be stably maintained. A conversion from a power source for commercial frequencies may be made directly to the voltage applied to the filament (2.5 V at the start and 1.0 V thereafter), or a commercially mass-produced switching source may be used to first convert a power source for commercial frequencies to an intermediate voltage such as 3.3 V, 5 V or 24 V, a DC/DC converter being then used for conversion to the desired filament voltage. Since the output voltage of a switching power source can be easily varied from outside, there is no need to provide an expensive component such as a special source device for two voltages.

Another advantage of using switching power source circuits is that an input voltage in a wide range is acceptable. An input in the range of AC100 V to A V120 V or AC220 V to AC240 V can be made easily without any switching. Even an input in the range of AC100 V to AC240 V is possible without switching by steadying the base current of the switching transistor.

Since transformers for such a switching circuit function at high frequencies in the range of several tens to several hundred kHz, their volume and weight are relatively small. Thus, the atomic absorption photometer incorporating them can also be made compact. Since they have only few components such as a magnetic core and coils, they also have the advantage of being inexpensive.

The invention basically relates to the use of switching power sources as the light sources for the lamps of an atomic absorption photometer but such a switching power source may be used also for the digital and analog circuits for driving and controlling the spectroscope, the detector and other data processing equipment of the photometer such that all electric power sources of the photometer are of a switching type and hence conventional transformers for commercial frequencies can be dispensed with. In summary, the present invention provides atomic absorption photometers capable of maintaining stability in brightness of light sources by using an input voltage from a wide range, being efficient, safe, compact and economical.

What is claimed is:

1. An atomic absorption photometer comprising:

light sources emitting light;

an atomizer for causing atomic absorption of said emitted light;

means for spectroscopically analyzing said atomic absorption;

power sources for said light sources, said power sources each receiving a variable current, switching said variable current on and of and thereby outputting a constant voltage independent of variations in said variable current; and signal outputting means for outputting control signals for controlling currents through said light sources.

2. The photometer of claim 1 wherein said light sources include a hollow cathode lamp and a deuterium lamp having a filament, and wherein said power sources include a first power source connected with said hollow cathode lamp and a second power source connected with said deuterium lamp.

3. The photometer of claim 2 further comprising a first steady current circuit and a second steady current circuit, said first steady current circuit being connected in series with said first power source and said hollow cathode lamp, said second steady current circuit being connected in series with said second power source and said deuterium lamp, said first power source being connected through a switch to said deuterium lamp, said signal outputting means outputting control signals to said first steady current circuit, to said second steady current circuit and to said first power source.

4. The photometer of claim 2 wherein switching frequencies of said first power source and said second power source are such that neither of said frequencies is substantially equal to an integral multiple of the other.

5. The photometer of claim 2 further comprising a discharge-starting switch, said first power source being connected with said deuterium lamp through said discharge-starting switch which is closed when said deuterium lamp is initially caused to start discharging and closed after said deuterium lamp has started to discharge.

6. The photometer of claim 2 wherein said power sources further include a low voltage source which serves to apply a low voltage to said filament and to said signal outputting means.

7. The photometer of claim 1 wherein none of said power sources includes a transformer operating under commercial frequencies.

8. The photometer of claim 2 wherein none of said power sources includes a transformer operating under commercial frequencies.

9. A light source unit for an atomic absorption photometer, said light source unit comprising:
    light sources emitting light;
    power sources for said light sources, said power sources each receiving a variable current, switching said variable current on and off and thereby outputting a constant voltage independent of variations in said variable current; and
    signal outputting means for outputting control signals for controlling currents through said light sources.

10. The light source unit of claim 9 wherein said light sources include a hollow cathode lamp and a deuterium lamp having a filament, and wherein said power sources include a first power source connected with said hollow cathode lamp and a second power source connected with said deuterium lamp.

11. The light source unit of claim 10 further comprising a first steady current circuit and a second steady current circuit, said first steady current circuit being connected in series with said first power source and said hollow cathode lamp, said second steady current circuit being connected in series with said second power source and said deuterium lamp, said first power source being connected through a switch to said deuterium lamp, said signal outputting means outputting control signals to said first steady current circuit, to said second steady current circuit and to said first power source.

12. The light source unit of claim 10 wherein switching frequencies of said first power source and said second power source are such that neither of said frequencies is substantially equal to an integral multiple of the other.

13. The light source unit of claim 10 further comprising a discharge-starting switch, said first power source being connected with said deuterium lamp through said discharge-starting switch which is closed when said deuterium lamp is initially caused to start discharging and closed after said deuterium lamp has started to discharge.

14. The light source unit of claim 10 wherein said power sources further include a low voltage source which serves to apply a low voltage to said filament and to said signal outputting means.

15. The light source unit of claim 9 wherein none of said power sources includes a transformer operating under commercial frequencies.

16. The light source unit of claim 10 wherein none of said power sources includes a transformer operating under commercial frequencies.

17. An atomic absorption photometer comprising:
    light sources emitting light, said light sources including a hollow cathode lamp and another lamp;
    an atomizer for causing atomic absorption of said emitted light;
    means for spectroscopically analyzing said atomic absorption;
    power sources for said light sources, said power sources each receiving a variable current, switching said variable current on and off and thereby outputting a constant voltage independent of variations in said variable current, said power sources including a first power source connected with said hollow cathode lamp and a second power source connected with said another lamp; and
    signal outputting means for outputting control signals for controlling currents through said light sources.

18. The light source unit of claim 9 wherein said light sources include a hollow cathode lamp and another lamp, and wherein said power sources include a first power source connected with said hollow cathode lamp and a second power source connected with said another lamp.

* * * * *